United States Patent
Ugoletti et al.

(10) Patent No.: US 11,518,896 B2
(45) Date of Patent: Dec. 6, 2022

(54) BLACK INK

(71) Applicant: Dover Europe Sàrl, Novedrate (IT)

(72) Inventors: Marco Ugoletti, Milan (IT); Luca Guggiari, Como (IT)

(73) Assignee: Dover Europe Sàrl, Vernier (CH)

( * ) Notice: Subject to any disclaimer, the term of this patent is extended or adjusted under 35 U.S.C. 154(b) by 599 days.

(21) Appl. No.: 16/499,093

(22) PCT Filed: Mar. 28, 2018

(86) PCT No.: PCT/IB2018/052118
§ 371 (c)(1),
(2) Date: Sep. 27, 2019

(87) PCT Pub. No.: WO2018/178890
PCT Pub. Date: Oct. 4, 2018

(65) Prior Publication Data
US 2021/0087416 A1    Mar. 25, 2021

(30) Foreign Application Priority Data
Mar. 29, 2017   (IT) .......................... 102017000034546

(51) Int. Cl.
*C09D 11/328*    (2014.01)
*C09D 11/033*    (2014.01)
*C09D 11/40*    (2014.01)
*C08K 5/053*    (2006.01)
*D06P 3/54*    (2006.01)
*D06P 5/20*    (2006.01)
*D06P 5/30*    (2006.01)

(52) U.S. Cl.
CPC ............ *C09D 11/328* (2013.01); *C08K 5/053* (2013.01); *C09D 11/033* (2013.01); *C09D 11/40* (2013.01); *D06P 3/54* (2013.01); *D06P 5/2077* (2013.01); *D06P 5/30* (2013.01)

(58) Field of Classification Search
CPC ..... C09D 11/328; C09D 11/033; C09D 11/40; C08K 5/053; D06P 3/54; D06P 5/2077; D06P 5/30
See application file for complete search history.

(56) References Cited

U.S. PATENT DOCUMENTS

| | | |
|---|---|---|
| 2007/0030324 A1 | 2/2007 | Chevli |
| 2007/0085888 A1* | 4/2007 | Chevli ...................... D06P 5/30 347/100 |
| 2007/0107626 A1 | 5/2007 | Chevli |
| 2009/0039543 A1 | 2/2009 | Sierakowski et al. |
| 2015/0240091 A1* | 8/2015 | Tabayashi .............. C09D 11/38 106/31.13 |

FOREIGN PATENT DOCUMENTS

| | | |
|---|---|---|
| CN | 106087464 | 11/2016 |
| CN | 106221380 | 12/2016 |
| EP | 3023464 | 5/2016 |
| WO | 2018178890 | 10/2019 |

OTHER PUBLICATIONS

Encyclopedia of Chinese Chemical Commodities, 1995 ed., China Material Press (ed.), Feb. 1996, pp. 1432 and 1434 (with English translation).
Office Action in Chinese Appln. No. 201880021435.0, dated Apr. 14, 2022, 20 pages (with English translation).
PCT International Search Report and Written Opinion in International Application No. PCT/IB2018/052118, dated May 30, 2018, 12 pages.
IT Search Report in Italian Application No. 201700034546, dated Oct. 23, 2017, 7 pages.
[No Author Listed], "Encyclopedia of Chinese Chemical Products," compiled by the Chemical Industry Press, Chemical Industry Press, Jan. 2005, p. 538 (with partial informal translation).
[No Author Listed], "Technology and Development for Dyeing and Finishing," compiled by China Printing and Dyeing Industry Association, China Textile Press, Jan. 1996, p. 32 (with partial informal translation).
Chen, "Overview of 60 Years of Disperse Dye Development (Continued II)," Abstract, Textile Dyeing and Finishing Journal, Oct. 2016, pp. 43-50 (with Machine English Abstract).
Song et al., "Dyeing and Finishing of New Fibers and Fabrics," China Textile Press, Jan. 2006, pp. 251-252 (with partial informal translation).

* cited by examiner

*Primary Examiner* — Yaovi M Ameh
(74) *Attorney, Agent, or Firm* — Fish & Richardson P.C.

(57) ABSTRACT

The invention refers to a disperse black ink comprising: an aqueous vehicle and a black dye dispersion comprising: disperse blue 165, disperse orange 29, disperse red 82 and disperse blue 60, and the use of such black ink in a method for inkjet-printing on a fabric.

19 Claims, No Drawings

BLACK INK

CROSS-REFERENCE TO RELATED APPLICATIONS

This application is a U.S. National Stage Entry under 35 USC § 371 of International Patent Application No. PCT/IB2018/052118, filed on Mar. 28, 2018, which claims the benefit of Italian Patent Application No. 102017000034546, filed on Mar. 29, 2017, both of which are hereby incorporated by reference in their entirety.

FIELD OF THE INVENTION

The invention refers to a disperse black ink comprising a mixture of the dyes disperse blue 165, disperse orange 29, disperse red 82, and disperse blue 60. A set of inks for the inkjet printing comprising such black ink, the use of such black ink in a method for the inkjet printing on a fabric, preferably of polyester or polyester blends, by applying such black ink, are further objects of the invention.

BACKGROUND

Inkjet printing is a particular method for digital printing wherein the pattern to be printed is obtained by suitable graphical software and is directly impressed on the support to be printed by an ink jet which ejects small ink droplets on such support. Ejecting the ink can be continuous or only when required (drop on demand, also known as DOD). In turn, in the DOD system, the mechanism for ejecting the drops can be of two types: thermal or piezoelectric. In the first case, at each nozzle, there is a resistor through which current pulses are supplied; at each pulse, the resistor heats to the temperature of some hundred degrees in few microseconds, and generates in the ink in contact with it a vapor bubble. The expansion of the latter causes the ejection of a drop from the overlying nozzle. In the second case, there is a small channel surrounded by a piezoelectric crystal below each nozzle; an electric pulse causes the crystal to deform and consequently to suddenly throttle the small channel and to eject the ink.

In the last years, digital inkjet printing has become more and more important as a method for printing on fabrics since it shows many advantages with respect to conventional printing methods, e.g. silk-screen printing. Indeed, digital inkjet printing is rid of the high costs associated to the implementation of a silk-screen printing plant which, for small quantities of articles of clothing, is unprofitable. Moreover, the digital inkjet printing enables to use a great number of colors and the associated gradients. Lastly, faster inkjet printers are now available on the market, which consequently are used in the industrial field: such printers exhibit ink printing heads having a large number of nozzles suitable for water-based inks. Digital inkjet printers adapted to be used with water-based inks are for example Artistri® 2020 and 3210 Textile (E.I. du Pont de Nemours), Textile Jet (Mimaki), Display-Maker Fabrijet (MacDermid Color Span), Amber, Zircon, Amethyst and Pike (Stork), series JP and Lario (MS Printing Solutions), series Rhotex and Kappa (Durst), Vutek (Efi), Renoir (Efi-Reggiani), Monnalisa (Robustelli).

Among the synthetic fibers, polyester is one of the most used fibers in the textile field; it can be used alone or with other natural or synthetic fibers, can be more or less thin, and can be processed to be adapted to different conditions of use. Polyester can be used as a mixing with cotton or nylon, polypropylene, Lycra, etcetera, for making substantially any article of clothing, e.g. shirts, trousers, jackets, underclothes, gloves, etcetera. Moreover, polyester is more and more used as padding for winter clothing, such as a raw fiber for obtaining a fleece fabric and as a breathable material, in the form of hollow core polyester for technical sportswear.

Disperse dyes are widespread used in printing fabrics, particularly in printing hydrophobic fibers, such for example polyester and cellulose acetates.

Disperse dyes systems must have specific requirements to be used in inkjet digital printing of fabrics, for example the capability of passing through the nozzles of the printer, stability in use and storage, color properties such as the strength.

After printing, following exposure to light, the black color, can lose its original intensity or can change shade. The action of light on dyes actually causes a complex series of processes, particularly the energy of the incident radiations causes more or less intense changes of the colors since the dye molecules, by absorbing part of the radiation energy, switch to an excited state, which can induce chemical reactions; this results in degradation of the color.

Therefore, in textile printing, it is strongly desirable to use colors which are extremely light-fast and in many cases, this confers a great added value, consequently increasing the quality of the printed artifact.

SUMMARY OF THE INVENTION

The present inventors have found that a black ink comprising specific dye dispersion imparts to fabrics an intense color strength and a high light-fastness.

Therefore, a first object of the invention is a black ink suitable for inkjet printing, comprising a mixture of the dyes disperse blue 165, disperse red 82, disperse orange 29 and disperse blue 60.

A second object of the present invention is an ink set comprising:
 a black ink according to the first object of the invention, and
 at least one colored ink selected from cyan, magenta, yellow, red, violet, blue, and orange, comprising at least one disperse dye in an aqueous vehicle.

A third object of the present invention is a method for inkjet printing on a fabric using an ink according to the first object of the invention or an ink set according to the second object of the invention.

Preferably, said method comprises the following steps:
 (a) providing an inkjet printer responsive to digital signals,
 (b) loading the printer with the fabric to be printed,
 (c) filling the printer with a black ink according to the first object of the invention or an ink set according to the second object of the invention,
 (d) printing on the fabric by using said ink or said ink set in response to a digital signal and, optionally
 (e) fixing the inks printed on the fabric by heat,
 (f) washing the so-treated fabric.

A fourth object of the present invention is the use of a black ink according to the first object of the invention or of an ink set according to the second object of the invention in inkjet printing.

A fifth object of the invention is a composition for preparing a black ink according to the invention, comprising the following mixture of disperse dyes in an aqueous vehicle:

from 5 to 20%, preferably from 5 to 15%, even more preferably 8% by weight of disperse blue 165;

from 2 to 10%, preferably from 3 to 8%, even more preferably 4.8% by weight of disperse orange 29, from 2 to 10%, preferably from 3 to 8%, even more preferably 5.2% by weight of disperse red 82, and from 0.5 to 5%, preferably from 1 to 3%, even more preferably 2% by weight of disperse blue 60.

Definitions

The disperse dyes of the present invention are substantially insoluble in the aqueous vehicle and are dispersed in conventional dispersants known to the man skilled in the art by dispersing techniques commonly used in the preparation of inkjet-printing inks.

The disperse dyes of the present invention are identified by the designation "C.I.", established by Society Dyers and Colourists, Dradford, Yorkshire, UK, published in Color Index, 3rd edition, 1971.

In the present invention, the color of the printed ink was evaluated by the colorimetric model L*a*b* as coded by the International Commission on Illumination (CIE) and also known as CIE L*a*b*. By means of this model, the color is determined by three values: L*, the luminance, the values thereof vary from 0 to 100; a* and b*, two color coordinates which respectively represent the tendency to the green color (a*<0)/red color (a*>0) and also to the blue color (b*<0)/yellow color (b*>0) with values from −120 to +120. By using as a color measuring system, the scale L*a*b*, it is possible to compare the ink of the invention with the inks formulated with different C.I. for the same concentration. Particularly, for blacks it is important to take into account the luminance value L*, which theoretically goes from 0 to 100. The higher the value of L* is, the lighter the printed artifact will be.

"Light-fastness", according to the present invention, means the resistance of a printed color to the degradation caused by the exposition to the light. This characteristic is evaluated by referring to the method described by the international standard EN ISO 105 B02.

"Amount of printed ink", according to the present invention, means the weight of the ink per surface unit of fabric, which is measured as grams of ink per square meter of fabric (gr/m$^2$).

"Aqueous vehicle", according to the present invention, means a solution, suspension or emulsion wherein the dyes are dispersed. The aqueous vehicle consists of an aqueous solvent and any ink additives, when present, and therefore consists in all components of the ink different from the dyes.

"Aqueous solvent", according to the present invention, means water or a mixture of water and one or more water miscible organic solvents.

"Additives" or "additives of ink", according to the present invention, refer to all the components of an ink different from the dyes and from the aqueous solvent.

DETAILED DESCRIPTION OF THE INVENTION

The first object of the present invention is a black ink suitable for inkjet-printing, comprising a mixture of the dyes disperse blue 165 (also referred to as DB165), disperse red 82 (also referred to as DR82), disperse orange 29 (also referred to as DO29), and disperse blue 60 (also referred to as DB60).

Preferably, said black ink does not contain any other dyes in addition to the above mixture of dyes. In this preferred embodiment, the dyes present in the black ink according to the first object of the invention thus consist in the said mixture.

The percentage by weight of the mixture of dyes present in the ink comprises the sum of the percentages of each dispersed dyes.

Preferably, the black ink, according to the first object of the invention, comprises:

from 2 to 10% by weight of disperse blue 165, from 0.5 to 5% by weight of disperse red 82, from 0.5 to 5% by weight of disperse orange 29, and from 0.2 to 4% by weight of disperse blue 60, based on the total weight of the ink.

More preferably, the black ink, according to the first object of the invention, comprises:

from 3 to 8%, more preferably from 3 to 6%, even more preferably 4% by weight of disperse blue 165, from 1 to 4%, more preferably from 2 to 3%, even more preferably 2.4% by weight of disperse red 82, from 1 to 4%, more preferably from 2 to 3%, even more preferably 2.6% by weight of disperse orange 29, from 0.5 to 2%, more preferably from 0.5 to 1.5%, even more preferably 1% by weight of disperse blue 60, based on the total weight of the ink.

According to a particularly preferred embodiment, the black ink according to the first object of the invention, comprises 4% by weight of disperse blue 165, 2.4% by weight of disperse red 82, 2.8% by weight of disperse orange 29, and 1% by weight of disperse blue 60.

Preferably, said mixture of dyes is dispersed in an aqueous vehicle, preferably consisting of an aqueous solvent as defined above, and by any additives of the ink, if present.

Preferably, the black ink according to the first object of the invention comprises, preferably consists of:

from 70 to 98%, preferably from 70 to 95%, more preferably from 82 to 92%, more preferably from 88 to 92%, even more preferably 90% by weight of an aqueous vehicle, and from 2 to 30%, preferably from 5 to 30%, more preferably from 8 to 18, more preferably from 8 to 12%, even more preferably 10% by weight of said mixture of dyes, based on the total weight of the ink.

The speed of an ink drop, the length of the ligament of the drops, the size and stability of the flow of the drops are strongly influenced by the surface tension and viscosity of the ink.

Therefore, preferably, the black ink according to the first object of the invention shows a surface tension comprised between 20 and 40 mN/m, more preferably comprised between 25 and 35 mN/m at 25° C. and/or a viscosity comprised between 3 and 9 mPa*s, more preferably comprised between 4 and 8 mPa*s at 25° C.

A second object of the present invention is an ink set comprising:

a black ink according to the first object of the invention, and at least one colored ink selected among cyan, magenta, yellow, red, violet, blue, and orange, comprising at least one disperse dye in an aqueous vehicle, as hereinbefore defined.

In a preferred embodiment of the second object of the invention, the set comprises a black ink according to the first object of the invention, and cyan, magenta, yellow, red, violet, blue, and orange inks, each comprising at least one dye dispersed in an aqueous vehicle.

According to the second object of the present invention, the cyan ink comprises a disperse dye selected among DB60, DB56, DB27, DB87, DB257, DB367, and mixtures thereof.

According to the second object of the present invention, the magenta ink comprises a disperse dye selected among DR76, DR92, DR86, DR89, DR5, DR75, DR121, DR127, DR132, DR145, DR159, DR164, DR179, DR184, DR189, DR191, and mixtures thereof.

According to the second object of the present invention, the yellow ink comprises a disperse dye selected among DY5, DY42, DY33, DY50, DY59, DY114, DY79, DY83, DY98, DY100, DY122, DY139, DY140, DY160, DY199, DY201, DY204, DY206, DY224, DY231, and mixtures thereof.

According to the second object of the present invention, the red ink comprises a disperse dye selected among DR54, DR177, DR229, DR258, and mixtures thereof.

According to the second object of the present invention, the violet ink comprises a dispersed dye selected among DV26, DV57, DV37, and mixtures thereof.

According to the second object of the present invention, the orange ink comprises a disperse dye selected among DO44, DO29, DO30, and mixtures thereof.

According to the second object of the present invention, the blue ink comprises a disperse dye selected among DB77, DB77:1, DB79, DB79:1, DB291:1, DB165, DB165:1, DB73, and mixtures thereof.

According to the second object of the present invention, the at least one colored ink can be selected in the "light" version.

According to the second object of the invention, the set can comprise also a further ink of a different color or with color shades different from the listed ones, comprising a disperse dye.

According to the first and/or second objects of the invention, preferably the aqueous vehicle contains, as an aqueous solvent, water, optionally mixed with one or more organic solvents.

Preferably, the black ink comprises from 60 to 90%, preferably from 65 to 85%, more preferably from 70 to 80% by weight of water, based on the total weight of the ink.

The type of the organic solvent used in the aqueous vehicle of the ink, according to the first and/or second objects of the invention, and the amount thereof depend on the type of application, its surface tension, viscosity and pressure vapor, its water solubility, the dye used, the compatibility with the materials forming the printing apparatus and also on the substrate on which the ink must be printed.

Examples of organic solvents miscible with water, that can be used in the aqueous vehicle of the black or colored ink, include alcohols, ketones, keto-alcohols, ethers, and others, e. g. thiodiglicol, sulfolane, 2-pyrrolidone, 1,3-dimethyl-2-imidazolidinone and caprolactam; glycols, e. g. ethylene glycol, diethylene glycol, triethylene glycol, tetraethylene glycol, propylene glycol, dipropylene glycol, tripropylene glycol, trimethylene glycol, butylene glycol, and hexylene glycol; oxyethylene or oxypropylene addition polymers, e. g. polyethylene glycol, polypropylene glycol, and similar; triols e. g. glycerol and 1,2,6-hexanetriol; lower alkyl ethers of polyhydric alcohols, e. g. ethylene glycol monomethyl ether, ethylene glycol monoethyl ether, diethylene glycol monomethyl ether, diethylene glycol monoethyl ether; lower dialkyl ethers of polyhydric alcohols, e. g. diethylene glycol dimethyl or diethyl ether.

The organic solvent is present in the aqueous vehicle of the ink according to the first and/or second objects of the invention in an amount from 2 to 70%, preferably from 5 to 50%, more preferably from 5 to 30%, even more preferably from 7 to 25%, based on the total weight of the aqueous vehicle.

According to a preferred embodiment of the black ink according to the first object of the invention, the aqueous solvent consists of a mixture of water, glycerol and propylene glycol. Preferably, in this case, the black ink comprises, based on the total weight of the ink, from 2 to 15%, preferably from 5 to 10%, more preferably from 7 to 9%, even more preferably 8.5% by weight of glycerol, from 1 to 3%, preferably from 1.5 to 2.5%, more preferably 2% by weight of propylene glycol, and from 60 to 90%, preferably from 65 to 85%, more preferably from 70 to 80% by weight of water.

According to the first and second objects of the invention, the aqueous vehicle further comprises additives normally used with dispersed inks, in so far as they do not interfere with stability and capability of the final ink to be ejected.

Particularly, in the aqueous vehicle according to the first object of the invention, the additives, if present, are less than 15% by weight based on the total weight of the ink.

Said additives, which are well known to a person skilled in the art and commonly used in the field, include: surfactants for adjusting the surface tension and the wettability; dispersing polymers for improving the stability; biocides for preventing the growth of microorganisms; pH regulators for adjusting the pH; sequestering agents (i.e. chelating agents) for eliminating the effects of metal ions possibly present as impurities.

Surfactants suitable as additives are, for example, ethoxylated acetylenic diols (i.e. the Surfynols® series by Air Products), primary ethoxylated alcohols (i.e. the Genapol® series by Clariant), and secondary ethoxylated alcohols (i.e. the Tergitol® series by Union Carbide), sulfosuccinates (i.e. the Aerosol® series by Cytec), organosilicons (i.e. the Silwet® series by GE Silicons) and fluorinated surfactants (i.e. the Zonyl® series by DuPont). Specifically, in the black ink according to the first object of the invention, the surfactants, if present, are used in amounts comprised between 0.01 and 5% by weight, preferably between 0.2 and 2% by weight, even more preferably between 0.2 and 3% by weight based on the total weight of the ink.

Dispersing polymers suitable as additives are, for example, polymers soluble or dispersible in the aqueous vehicle, and may be ionic or non-ionic. Suitable classes of polymers can be acrylic polymers, styrene acrylic polymers and polyurethanes. Commercial polymers falling in said chemical classes and suitable to be used in the ink of the present invention can be, for example, DISPERBYK-190, marketed by BYK-Chemie GmbH and the Joncryl series marketed by BASF SE.

Particularly, in the black ink according to the first object of the invention, the dispersing polymers, if present, are used in an amount of less than 15% by weight based on the total weight of the ink, preferably in an amount comprised between 1 and 10%, more preferably between 1 and 6%, even more preferably 4% by weight, based on the total weight of the ink.

Biocides suitable as additives include, for example, Proxel GXL (marketed by Lonza Ltd.).

pH regulators suitable as additives include, for example, tris(hydroxymethyl)-aminomethane ("Trizma" or "Tris"), TEA (triethanolamine) and 2-amino-2-methylpropane-1-olo (AMP95, marketed by Dow Chemical Company).

Sequestering agents suitable as additives include ethylenediaminetetraacetic acid (EDTA), iminodiacetic acid (IDA), ethylenediamine-di(o-hydroxyphenylacetic acid (EDDHA), nitroloacetic acid (NTA), dihydroxyethylglicine (DHEG), trans-1,2-cyclohexanediaminetetraacetic acid (CyDTA), ethylenetriamine-N,N,N',N'',N''-pentaacetic acid (DTPA), glycoletherdiamine-N,N,N',N'-tetraacetic acid (GEDTA), and salts thereof.

According to a particularly preferred embodiment of the black ink according to the first object of the invention, this comprises, as additive agents, a pH regulator, preferably 2-amino-2-methylpropane-1-olo, a surfactant, preferably an ethoxylated acetylenic diol, and a dispersing polymer, preferably the polymer marketed under the trademark DISPERBYK-190 consisting of a 40% water solution of a high molecular weight block copolymer with pigment affinic groups. The amounts of surfactants and polymers are adjusted so as to preferably obtain the preferred values of surface tension and viscosity indicated above.

Preferably, in the black ink according to the first object of the invention, pH has a value comprised between 6 and 9, preferably between 7 and 8, even more preferably of 7.5.

A particularly preferred formulation of the black ink according to the present invention comprises:
  4% by weight of disperse blue 165;
  2.4% by weight of disperse red 82;
  2.6% by weight of disperse orange 29;
  1% by weight of disperse blue 60;
  8.5% by weight of glycerol;
  2% by weight of propylene glycol;
  4% of a dispersing polymer;
  from 71% to 80% by weight of water.

Preferably, such formulation further comprises a pH regulator, preferably 2-amino-2-methylpropane-1-olo, a surfactant, preferably an ethoxylated acetylenic diol and a biocide. The amounts of surfactant and polymer are preferably calibrated so as to obtain the preferred surface tension and viscosity values indicated above.

As it will be demonstrated in the experimental portion, the black ink according to the first object of the invention has relatively low values of L* in the selected printing modes, and a good light fastness value measured according to the standard EN ISO 105 B02.

Therefore, a third object of the present invention is a method for inkjet-printing on a fabric, using a black ink according to the first object of the invention or an ink set according to the second object of the invention.

Preferably, said method comprises the following steps:
  (a) providing an inkjet printer responsive to digital signals,
  (b) loading the printer with the fabric to be printed,
  (c) loading the printer with a black ink according to the first object of the invention or an ink set according to the second object of the invention,
  (d) printing on the fabric by using said ink in response to a digital signal and, optionally:
  (e) fixing the dispersed ink,
  (f) washing the digitally printed fabric.

Preferably, according to the third object of the invention, the printer is filled by an ink set according to the second object of the invention.

A fourth object of the present invention is the use of a black ink according to the first object of the invention or of an ink set according to the second object of the invention for inkjet printing, preferably of fabrics.

According to the third and fourth objects of the invention, the fabric is made of polyester and/or a polyester blend. An example of polyester fabric is Georg+otto Friedrich, 6050 KBC, made of 100% polyester, 115 g/m² and pre-treated for a direct printing, so that the ink applied during the inkjet-printing, is absorbed by the fabric itself. Suitable pre-treatments are known to a person skilled in the art, and are applied by known methods, for example by dipping or spraying. After the pre-treatment, the fabric is generally dried by traditional methods, generally at a temperature less than 100° C. until the fabric is dry.

According to the third and fourth objects of the invention, printing is preferably performed by an inkjet printer with DOD technology, for example, a printer selected among Artistri® 2020 and 3210 Textile (E.I. du Pont de Nemours), Textile Jet (Mimaki), Display-Maker Fabrijet (MacDermid Color Span), Amber, Zircon, Amethyst and Pike (Stork), series JP and Lario (MS Printing Solutions), series Kappa and Rhotex (Durst), Vutek (Efi), Renoir (Efi-Reggiani) or Monnalisa (Robustelli).

The amount of ink applied on the fabric depends on the printer model and its resolution, and on the ink amount necessary to achieve a certain color. Based on such considerations, the amount in grams of ink printed per unit of area of the fabric for a given color is determined. In an embodiment according to the third and fourth objects of the invention, 0.5-20 grams of ink per m² of fabric are applied.

The printed fabric according to the third and fourth objects of the invention is post-treated by methods known to the person skilled in the art. Preferably, the fabric is maintained at 25° C. at a relative humidity less than 50% before fixing the color. Color fixing can be performed by dry heat, preferably at 200° C. for 1 minute; by pressurized vapor, preferably at 140° C. for 25 minutes; or superheated vapor, preferably at 170-180° C. for 7-10 minutes. After the fixing step, preferably the printed fabric is washed by cold water for 10-15 minutes. The dye surplus is then removed by reduction using a solution of 1 g/liter of sodium hydroxide, 2 g/liter sodium hydrosulfite, and 1 g/liter an anionic surfactant for 10-15 minutes at 70° C. Any anionic surfactant suitable for washing dispersed dyes on polyester fabric can be used as an anionic surfactant.

A fifth object of the invention is a composition for preparing a black ink according to the invention, comprising the following mixture of disperse dyes in an aqueous vehicle:
  from 5 to 20%, preferably from 5 to 15%, even more preferably 8% by weight of disperse blue 165,
  from 2 to 10%, preferably from 3 to 8%, even more preferably 4.8% by weight of disperse orange 29,
  from 2 to 10%, preferably from 3 to 8%, even more preferably 5.2% by weight of disperse red 82, and
  from 0.5 to 5%, preferably from 1 to 3%, even more preferably 2% by weight of disperse blue 60,
  based on the total weight of the composition.

Still more preferably, said composition further comprises a dispersing polymer as described above. Preferably, said dispersing polymer is present in a quantity comprised between 5 and 30%, preferably between 6 and 15%, even more preferably 8% by weight, based on the total weight of the composition.

The composition according to the fifth object of the invention has proven to be stable over time and can be stored and used as an intermediate for preparing the black ink according to the first object of the invention by dilution with the remaining components of the same.

EXPERIMENTAL PART

Example 1

Preparing Concentrated Dispersions of Dyes

The concentrated dispersions of several dyes were prepared by mixing 20% by weight of a powder of a disperse dye, 20% by weight of a polymeric dispersant (Disperse BYK 190), 8% by weight of glycerol, 2-amino-2-methyl-propane-1-olo (AMP 95) as much as suffices to have a pH of 7.5, water as much as suffices to have 100%.

Particularly, six different concentrated dispersions were prepared:

the concentrated dye dispersion 1 comprised 20% by weight of disperse orange 29 (DO29);
the concentrated dye dispersion 2 comprised 20% by weight of disperse red 82 (DR82);
the concentrated dye dispersion 3 comprised 20% by weight of disperse red 54 (DR54);
the concentrated dye dispersion 4 comprised 20% by weight of disperse blue 165 (DB165);
the concentrated dye dispersion 5 comprised 20% by weight of disperse blue 291.1 (DB291;1);
the concentrated dye dispersion 6 comprised 20% by weight of disperse blue 60 (DB60).

The obtained concentrated dye dispersions 1 to 6 were mixed in a disperser until they looked homogeneous, and were then ground by a microsphere mill in order to obtain particles with an average size comprised between 0.05 and 0.3 microns.

Example 2

Preparing Concentrated Compositions

By suitably mixing the concentrated dye dispersions, prepared as described in example 1, two different black-colored compounds having the following composition, expressed in a percentage by weight based on the total weight of the obtained composition, were obtained:

Concentrated Black Composition 1 According to the Invention

40% concentrated dispersion of disperse blue 165 (DB165),
24% concentrated dispersion of disperse red 82 (DR82),
26% concentrated dispersion of disperse orange 29 (DO29), and
10% concentrated dispersion of disperse blue 60 (DB60).

Concentrated Black Composition 2, Comparative

52% concentrated dispersion of disperse blue 291.1 (DB291:1),
18% concentrated dispersion of disperse red 82 (DR82),
30% concentrated dispersion of disperse red 54 (DR54).

Example 3

Preparation of the Black Inks

A black ink according to the invention (INV ink) and a comparison ink (COMP ink) were prepared by adding to 4.5 parts of glycerol, by continuously stirring and mixing to uniformity, 0.2 parts of a biocide (Proxel GXL), 50 parts of a black concentrated composition 1 or prepared as indicated hereinbefore, 2 parts of propylenic glycol, 0.5 parts of an acetylenic surfactant (Surfynol 440) and water as much as suffices to 100%.

The concentrated black composition 1 (INV ink) was used for the ink of the invention, the concentrated black composition 2 (COMP ink) was used for the comparison ink.

The pH, viscosity and surface tension of the black ink according to the invention (INV ink) and comparison ink (COMP ink) were analyzed and were found very similar to each other, as it is shown in the following Table 1.

TABLE 1

| Ink | INV Ink | COMP Ink |
|---|---|---|
| pH | 7.4 | 7.5 |
| Viscosity (mPa*s at 25° C.) | 6.2 | 6.4 |
| Surface tension (mN/m) | 30.3 | 30.1 |

Example 4—Printing of Black Inks on Polyester Fabrics

The inks were filtered and, if necessary, degassed.
Each ink was then applied to a polyester fabric (Georg+Otto Friedrich, 6050 KBC, 100% polyester, 115 g/m$^2$ pre-treated for a direct printing) by a MS JP5 printer in the mode B, by depositing an ink quantity of 8.85 g/m$^2$.

After printing, the colour was fixed by steam at 170° C. for 10 minutes, then the fabrics was obtained as in the example by stripping it in a reducing bath, and then was washed.

Example 4—Measuring the Color on Polyester Fabrics

The fabrics printed by the inks (the fabric printed with INV ink, the fabric printed with COMP ink) were analyzed by a Datacolor DATAFLASH DF100 spectrophotometer by means of the color coordinates L*a*b*. The results of the readings of L*, a* and b* of the printed fabrics and of a not-printed fabric, are shown in Table 2.

TABLE 2

| Fabric | Amount of deposited ink (gr/m$^2$) | L* | a* | b* | Light fastness (ISO105B2) |
|---|---|---|---|---|---|
| Not-printed | / | 89.21 | 3.06 | −15.99 | |
| Printed by ink INV | 8.85 | 23.98 | 0.15 | −2.59 | 6 |
| Printed by ink COMP | 8.85 | 25.17 | 1.86 | −3.82 | 4 |

The data show both the inks have relatively low luminance values.

Example 4—Light Fastness Tests

Fabric samples printed by the two inks prepared as described above were subjected to light fastness tests according to the standard EN ISO 105 B02, well known to a person skilled in the textile field. The method refers to an evaluation scale from 1 to 8, wherein 1 is associated to a fast degradation of the color, and 8 is associated to a maximum value of light fastness.

Particularly, an index 6 was detected for the INV ink, and an index 4 was detected for the COMP ink. Considering that on this scale, approximately, an increase point corresponds a fastness about double in terms of time of light exposure, from the obtained data it is understood that the ink according to the invention has a resistance almost 4 times greater than the comparative ink in terms of time of exposure to the specific light source. Then, a light fastness index of 6 is, in absolute term, an optimal value with reference to the black inks formulated by this class of dyes.

The invention claimed is:

1. A black ink for use in inkjet printing, the black ink comprising a mixture of the dyes disperse blue 165, disperse red 82, disperse orange 29 and disperse blue 60 wherein the ink comprises, based on a total weight of the ink:
   2 to 10% by weight of disperse blue 165,
   0.5 to 5% by weight of disperse red 82,
   0.5 to 5% by weight of disperse orange 29, and
   0.5 to 2% by weight of disperse blue 60.

2. The black ink according to claim 1, wherein said mixture of dyes is dispersed in an aqueous vehicle comprising an aqueous solvent.

3. The black ink according to claim 2, comprising, based on the total weight of the ink:
   70 to 98% by weight of said aqueous vehicle,
   2 to 30% by weight of said mixture of dyes.

4. The black ink according to claim 1, having a surface tension between 20 and 40 mN/m at 25° C., a viscosity between 3 and 9 mPa*s at 25° C., or both.

5. The black ink according to claim 2, wherein said aqueous solvent consists of a mixture of water and an organic solvent.

6. The black ink according to claim 1, further comprising a pH regulator, a surfactant, and a dispersing polymer.

7. An ink set comprising:
   the black ink according to claim 1, and
   at least one colored ink selected from the group consisting of cyan, magenta, yellow, red, violet, blue, and orange, wherein the at least one colored ink comprises at least one disperse dye in an aqueous vehicle.

8. The ink set according to claim 7, wherein:
   the cyan ink comprises at least one disperse dye selected from the group consisting of DB60, DB56, DB27, DB87, DB257, and DB367,
   the magenta ink comprises at least one disperse dye selected from the group consisting of DR76, DR92, DR86, DR89, DR5, DR75, DR121, DR127, DR132, DR145, DR159, DR164, DR179, DR184, DR189, and DR191,
   the yellow ink comprises a disperse dye selected from the group consisting of DY5, DY42, DY33, DY50, DY59, DY114, DY79, DY83, DY98, DY100, DY122, DY139, DY140, DY160, DY199, DY201, DY204, DY206, DY224, and DY231,
   the red ink comprises a disperse dye selected from the group consisting of DR54, DR177, DR229, and DR258,
   the violet ink comprises a disperse dye selected from the group consisting of DV26, DV57, and DV37,
   the blue ink comprises a dye selected from the group consisting of DB77, DB77:1, DB79, DB79:1, DB291:1, DB165, DB165:1, and DB73, and
   the orange ink comprises a disperse dye selected from the group consisting of DO44, DO29, and DO30.

9. A method for inkjet-printing a fabric, the method comprising:
   (a) providing an inkjet printer responsive to digital signals,
   (b) loading the printer with a fabric to be printed,
   (c) loading the printer with the black ink according to claim 1 or an ink set according to claim 1, and
   (d) printing the fabric by using said ink in response to a digital signal.

10. The method according to claim 9, wherein the fabric is made of polyester or polyester blend.

11. The black ink according to claim 5, wherein said aqueous solvent consists of a mixture of water, glycerol, and propylene glycol.

12. The black ink according to claim 1, wherein a pH of the black ink is between 6 and 9.

13. The method according to claim 9, further comprising:
   (e) fixing the ink printed on the fabric by heat, and
   (f) washing the digitally printed fabric.

14. A composition for preparing a black ink comprising a mixture of the dyes disperse blue 165, disperse red 82, disperse orange 29 and disperse blue 60, the composition comprising the mixture of the dyes dispersed in an aqueous vehicle, the mixture of the dyes comprising:
   5 to 20% by weight of disperse blue 165;
   2 to 10% by weight of disperse orange 29,
   2 to 10% by weight of disperse red 82, and
   0.5 to 5% by weight of disperse blue 60,
   based on a total weight of the composition.

15. The composition according to claim 14, wherein the aqueous vehicle consists of a mixture of glycerol and water.

16. The black ink according to claim 11, comprising, based on the total weight of the ink, 2 to 15% by weight of glycerol, 1 to 3% by weight of propylene glycol, and 60 to 90% by weight of water.

17. The composition according to claim 15, further comprising a dispersing polymer.

18. The composition according to claim 15, comprising 5 to 15% by weight of glycerol, based on the total weight of the composition.

19. The composition according to claim 17, comprising 5 to 30% by weight of the dispersing polymer, based on the total weight of the composition.

* * * * *